United States Patent [19]

Hughes et al.

[11] 4,278,973

[45] Jul. 14, 1981

[54] VIDEO DISPLAY TERMINAL WITH PARTITIONED SCREEN

[75] Inventors: Michael A. Hughes, Stockbridge; Jeremy S. M. Johnson, Rownhams, both of England; Graham C. E. Winn, Woodstock, N.Y.

[73] Assignee: International Business Machines Corporation, Armonk, N.Y.

[21] Appl. No.: 80,732

[22] Filed: Oct. 1, 1979

[30] Foreign Application Priority Data

Oct. 2, 1978 [GB] United Kingdom ............... 39001/78

[51] Int. Cl.[3] ............................................ G06F 3/153

[52] U.S. Cl. .................................... 340/721; 340/711

[58] Field of Search ................................ 340/711, 721

[56] References Cited

U.S. PATENT DOCUMENTS

| | | | |
|---|---|---|---|
| 3,742,482 | 6/1973 | Albrecht et al. | 340/721 X |
| 3,872,460 | 3/1975 | Fredrickson et al. | 340/711 |
| 4,189,727 | 2/1980 | Vaughn | 340/711 |
| 4,204,206 | 5/1980 | Bakula et al. | 340/721 |

*Primary Examiner*—David L. Trafton

*Attorney, Agent, or Firm*—Mitchell S. Bigel; J. Jancin, Jr.; F. D. Poag

[57] ABSTRACT

A video data display terminal includes a video display, eg., a CRT, and a character buffer for storing character bytes representing characters to be displayed on the screen of the video display device. The terminal further includes microprocessing means for receiving data from a keyboard device connected thereto or alternately from a host processor for entry into the character buffer. The microprocessing means are further adapted to define one or more partitions on the screen of the video display device. Data integrity within these partitions is maintained by assigning margin attribute bytes to the margin of each partition. Refresh hardware including refresh logic control means, a line buffer, a character generator and a serializer is provided to write data within the character buffer to the video display screen.

12 Claims, 8 Drawing Figures

VIDEO DISPLAY TERMINAL WITH PARTITIONED SCREEN

DESCRIPTION

1. Technical Field

This invention relates to video display terminals generally and specifically to a video display terminal having a partioned screen.

2. Background Art

The video display terminal has become increasingly common for the entry and retrieval of data to and from a data base in a data processing system. Typically, a video display terminal includes a display device such as a cathode ray tube (CRT) and a keyboard for keying data and characters into the terminal. Characters entered via the keyboard are assembled in the character buffer and can be subsequently displayed on the CRT. The assembled data is transmitted, as required, from the terminal to a host processor to which the terminal is connected. Data may also be sent from the host to the terminal for display.

It has previously been proposed to partition the screen of a display device so that more than one independent display can be presented on a single screen. For example, the IBM Technical Disclosure Bulletin, Vol. 20, No. 10, March 1978, pages 4148 to 4151 describes an alphanumeric display in which two independent viewports are formed on a single display screen.

Problems can arise with a partitioned screen, particularly where it is required that the video display terminal be compatible with data prepared for non-partitioned screens. This requirement is particularly important where a customer having a large investment in applications developed for one type of video display terminal wishes to obtain a new, possibly more powerful display terminal without finding it necessary to change his programming investment.

Accordingly, one object of the present invention is to provide an improved video display terminal having a partitioned screen so that more than one display can be presented on a single display screen.

Another object of this invention is to provide means for insuring the independence of the displays presented on the display screen of a video display terminal having a partitioned screen.

Still another object of the present invention is to provide a video display terminal having a partitioned screen which is compatible with data prepared for a non-partitioned screen display device.

DISCLOSURE OF INVENTION

According to the present invention, a video display terminal comprises a video display device for displaying characters on the screen thereof, a character buffer for storing character code bytes representing the characters to be displayed on the display device, processing means operative to load characters to be displayed into the character buffer in positions corresponding to the desired positions of the characters on the screen of the display device, and display logic control means operative to cause characters stored in the character buffer to be displayed on the display device screen. The processing means further includes means for selectively defining one or more partitions on the screen of the display device and for assigning margin attribute bytes to the margin of each partition. The margin attribute byte associated with any line of data in a partition is generated so as to be functionally equivalent to the field attribute byte controlling the character located immediately adjacent the margin.

BRIEF DESCRIPTION OF DRAWINGS

The invention will now be particularly described, by way of example, with reference to the accompanying drawing, in which.

BEST MODE FOR CARRYING OUT THE INVENTION

Figure 1:
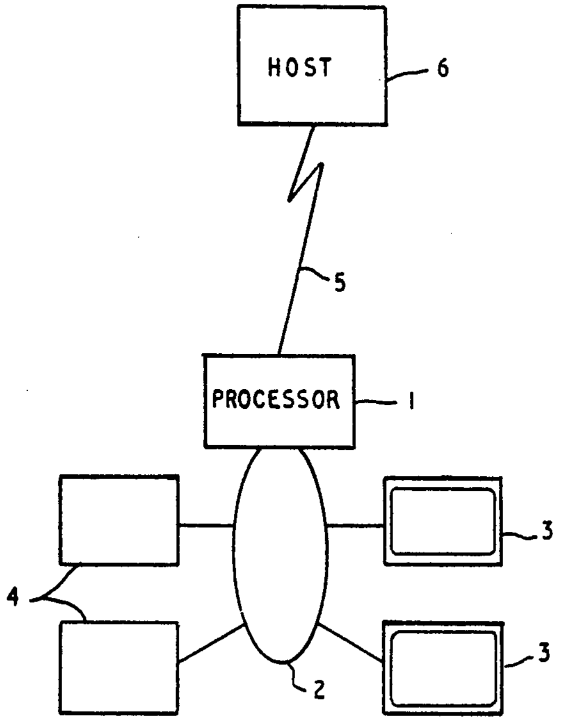
FIG. 1 is a schematic illustrating a data processing apparatus having various input/output terminals.

Referring now to FIG. 1, a processor 1 has a communication loop 2 to which are connected various video display devices 3 and other input/output devices 4. Optionally, processor 1 may be connected through a communication link 5 to a host processor 6. Such an arrangement allows an operator at one of the display devices 3 to interact with data stored within processor 1. As required, data in host processor 6 may be sent to processor 1 and data in processor 1, sent to one of the video display devices 3. Source data may also be entered at display device 3 by way of, for example a keyboard or light pen connected thereto, for entry into the data processing system.

Figure 2:
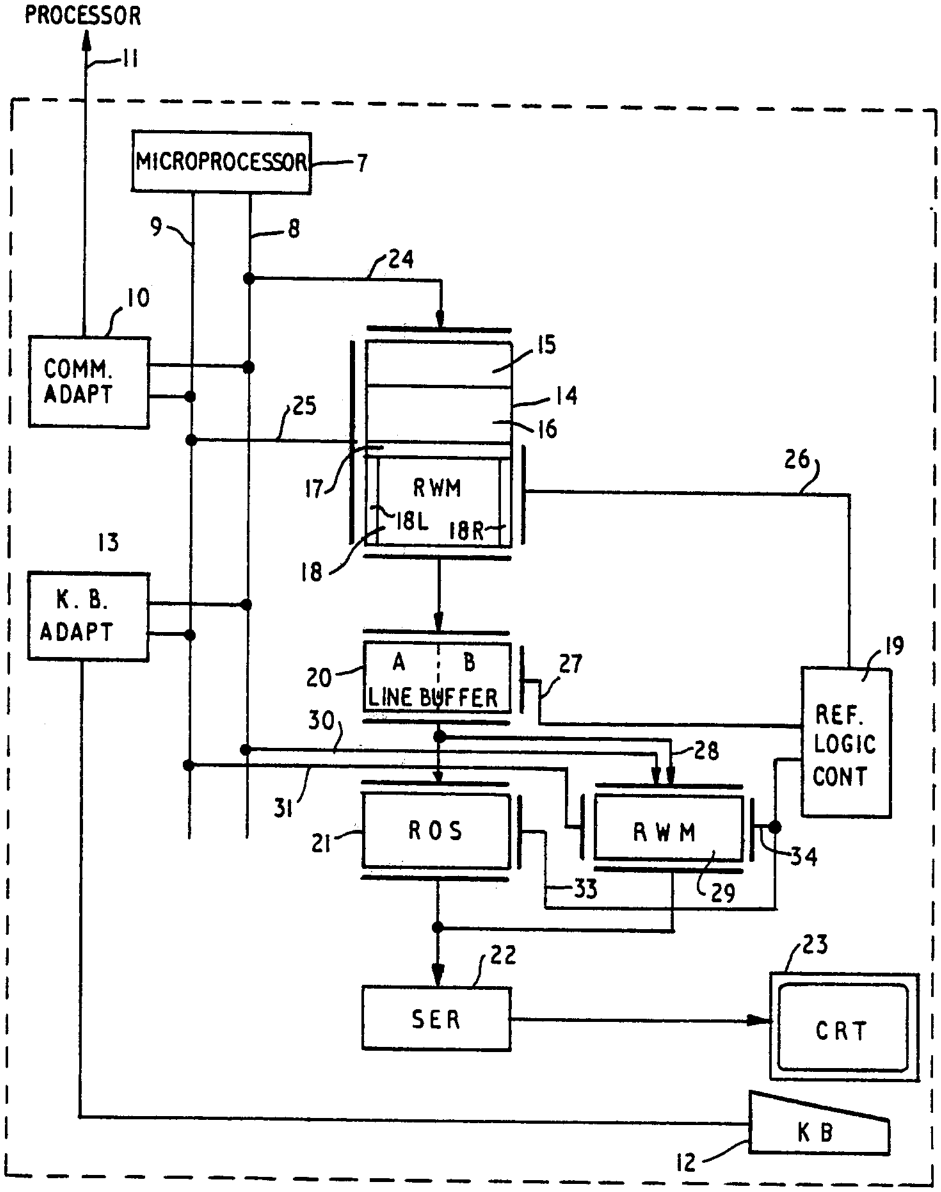
FIG. 2 is a schematic illustrating a preferred embodiment of the invention.

FIG. 2 schematically illustrates a preferred embodiment of the video display terminal. The terminal includes a microprocessor 7 having a data bus 8 and an address bus 9 connected thereto. Typically, microprocessor 7 will operate on 8-bit data bytes, data bus 8 being eight bits wide and address bus 9 being 16 bits wide. Microprocessor 7 can thus communicate with up to $2^{16}$ locations, transferring one byte of data at a time along data bus 8.

Connected to buses 8 and 9 is a communications adapter 10 through which the terminal can communicate with the loop 2, (see also FIG. 1) by means of link 11. Adapter 10 serializes and deserializes data streams to and from processor 1, and performs bit stuffing/unstuffing, flag recognition and block check code validation in accordance with the particular communication line protocol employed. The adapter can also subject inbound and outbound data streams to data compaction to allow efficient use of the communication links.

Still referring to FIG. 2, a keyboard 12 is connected to data and address buses 8 and 9 through a keyboard adapter 13. Keystrokes at keyboard 12 cause adapter 13 to raise an interrupt at microprocessor 7, which can then read the scan code from keyboard 12.

A read/write memory 14 is divided into a number of sections. Section 15 contains microcode tables for use by microprocessor 7, section 16 is loaded with data directly by the microprocessor, section 17 is loaded with data to be displayed in an indicator row on the screen, and section 18 constitutes a character buffer for containing data to be displayed on the screen of the display device. Because the display device is in the form of a cathode ray tube, (CRT), data on the screen must be refreshed and to this end, refresh logic control 19, constituted for example by a programmable logic array (PLA), is provided. The refresh hardware further includes a line buffer 20 into which characters to be displayed can be loaded a line at a time. In conventional manner, loaded characters within line buffer 20 access a character generator 21 in the form of a read/only store (ROS). ROS 21 contains bit information that is serialized in serializer 22, which in turn supplies video data to video display device 23. The line buffer 20 is in two sections, A and B, so that one line of characters is loaded into one section of the line buffer while the other section of the line buffer is refreshing the CRT screen.

Data can be read into and from read/write memory 14 by means of line 24 from data bus 8. Microprocessor 7 addresses the read/write memory along address line 25 connected to address bus 9 and can transfer data to be displayed from section 16 of read/write memory 14 into character buffer section 18. As mentioned above, refresh logic control 19 controls the loading of data to be displayed, line by line into line buffer 20. To this end, control 19 addresses section 18 of the read/write memory 14 along address line 26. This has the important advantage that the microprocessor 7 need not be taken up for CRT screen refresh.

Usually, each character position on the CRT screen is represented by one byte within character buffer 18. As an optional feature, extra storage can be provided in character buffer 18 so that each character position of the CRT screen is represented by two bytes. The first byte may be used to indicate the character or symbol. The second byte is an attribute byte and is used to indicate how the character is to be displayed; e.g., whether it is highlighted, underlined, flashing, in reverse video. If this optional feature is included, line buffer 20 must also be increased in size to accommodate the additional bytes associated with a line of characters.

As an alternative to ROS 21, or in addition thereto, a read/write memory (RWM) 29 acting as a character generator, can be loaded with additional character sets along line 30 by microprocessor 7 under control of address line 31. Once loaded with the required character set, read/write memory 29 can be addressed to bytes within line buffer 20 along line 28 to derive the bit pattern required to display those characters. Accessing of the read/only store 21 or read/write memory 29 during refresh is performed under control of refresh logic control 19 as represented by lines 33 and 34.

Figure 3:
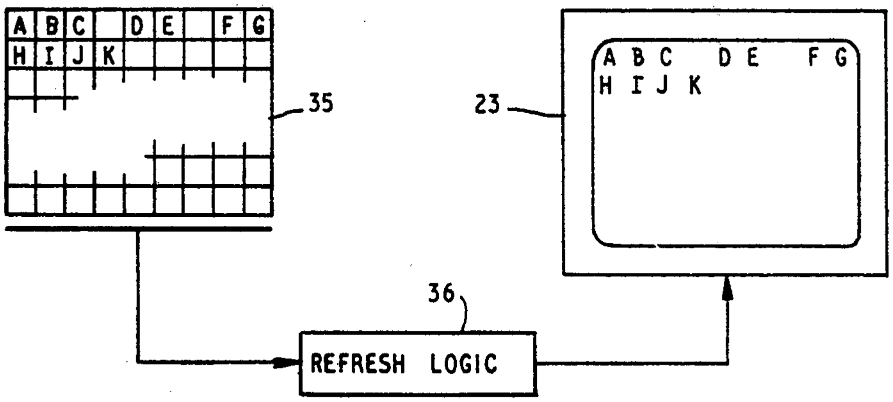
FIG. 3 is a block diagram illustrating the relationship between a mapped buffer and a display screen.

Before describing the operation of the display terminal in more detail, reference will be made to FIGS. 3 and 4. In FIG. 3, a display device 23 is capable of displaying seven rows of characters, each row having up to nine characters. To this end a refresh buffer 35, corresponding to character buffer 18, (see FIG. 2) is provided with 63 bytes of storage. The buffer 35 is a mapped buffer; that is, the position of each byte in the buffer 35 corresponds to its position on the display device screen. Similarly, where each character has associated with it an attribute byte, two bytes will correspond to each character position on the display device screen. This arrangement of buffer 35 contrasts an unmapped buffer arrangement wherein each character byte in the buffer has its address on the screen stored with it.

Figure 4:
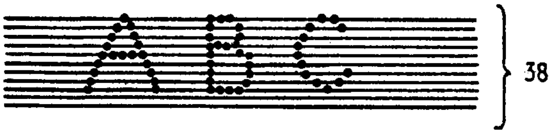
FIG. 4 illustrates the manner in which characters are formed on the screen of a cathode ray tube.

FIG. 4 illustrates how a character is built up on the screen, with each row of characters being formed by a number of raster lines 38. It is immaterial to the present invention whether the raster is non-interlaced or interlaced.

Returning now to FIG. 2, assume that data within the processor is to be displayed on display device 23. The data is received by microprocessor 7 via line 11, adapter 10 and data bus 8, and is then placed into section 16 of read/write memory 14 over data bus 8 and line 24. The data to be displayed is then loaded into character buffer section 18 of read/write memory 14 under control of microprocessor 7. If the data is formatted, field attribute bytes will be included within the data stream. These attribute bytes affect the manner in which the corresponding fields of data are displayed. Typical field attributes are, by way of example, "display," "non-display," "intensify," "protect," "lightpen selectable." These field attribute bytes are stored in the character buffer 18 and precede the characters they qualify. They will qualify all characters in the field they define, which extends to the next field attribute byte in the data stream. Refresh control logic 19 will then load lines of characters, (alphanumeric and attributes) from character buffer 18 into one section of line buffer 20. As this section is accessing the character generator ROS 21, to derive the bit pattern for screen refresh, the next line of characters will be loaded into the other section of the line buffer 20 and it in turn will access the character generator. This action will continue until all lines have been displayed, at which time, the process will be repeated. Messages to the operator are loaded into section 17 of memory 14 and are displayed in a similar manner. The serializer 22 recognizes the field attribute bytes and transmits the appropriate signals and controls to display device 23.

If data is entered into the terminal from keyboard 12, each character entered at the keyboard will be stored within section 16 of read/write memory 14 at a position determined by the position of a cursor on the screen of the display device.

Figure 5:
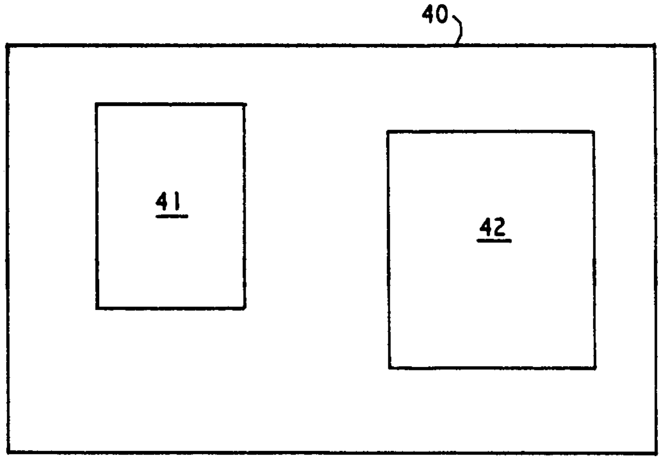
FIG. 5 illustrates a display screen formed with two partitions thereon.
Figure 6:
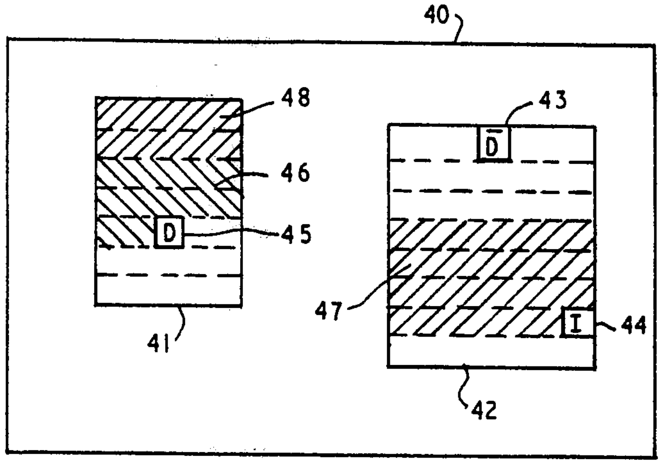
FIG. 6 illustrates that attribute bytes associated with characters in one partition can interfere with the display of characters in another partition.

FIG. 5 shows a display device screen 40 having two partitions 41 and 42. If the data within these partitions is not formatted, i.e., does not contain attribute bytes, generation of the partitions is straightforward. However, if the data is formatted, the data stream will contain field attribute bytes which may cause interference between the partitions. This is illustrated in FIG. 6. Partition 42 has two field attribute bytes 43 and 44. Partition 41 has one field attribute byte 45. Field attribute byte 43 is a non-display attribute and indicates that all data within the field it defines is not to be displayed. The refresh logic is unable to recognize separate partitions so that the effect of the field attribute byte 43 will be carried into partition 41. The data within section 46 of partition 41 will therefore be erroneously not displayed. Similarly, the "display" field attribute byte 45 in partition 41 will cause data within section 47 of partition 42 to be erroneously displayed. Finally, the "intensify" field attribute byte 44 in partition 42 will cause data in section 48 of partition 41 to be erroneously intensified.

Figure 7:
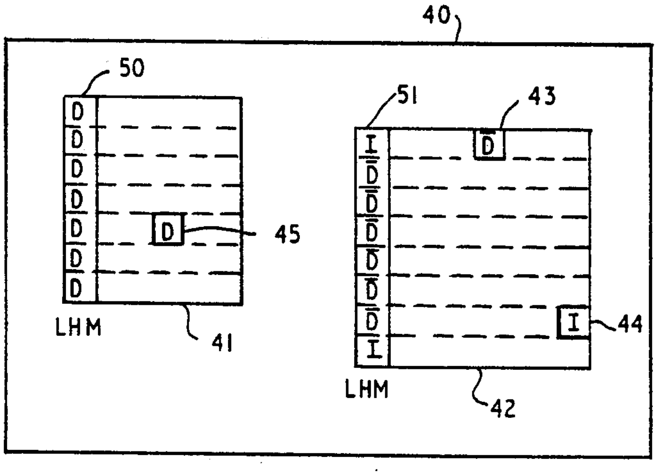
FIG. 7 illustrates how this interference can be prevented by using left hand margin attribute bytes on each partition.

This problem of interference is overcome by providing a left hand margin, field attribute byte, one character position in width, for each row of each partition on the display screen. These field attributes, termed LHM attributes, are inserted in the appropriate position in character buffer 18 by microprocessor 7. The function of the LHM attribute is to ensure that each row of the partition is properly displayed (see FIG. 7).

It is frequently desirable during data stream processing to search forward or backwards from a given character buffer location to the next field attribute byte. Another frequent operation is to erase characters from a given character buffer location up to the next field attribute byte. As these operations must be constrained within the partition concerned, it is necessary to wrap at the partition boundaries. LHM attributes may be used to assist the above operations by providing performance improvements and microcode savings when processing backwards through the partition. The search (or erase) algorithm may continue until an attribute character is encountered. It then performs a test to determine whether to wrap (i.e., a margin attribute byte has been encountered) or whether a genuine field attribute byte within the partition has been located.

Figure 8:
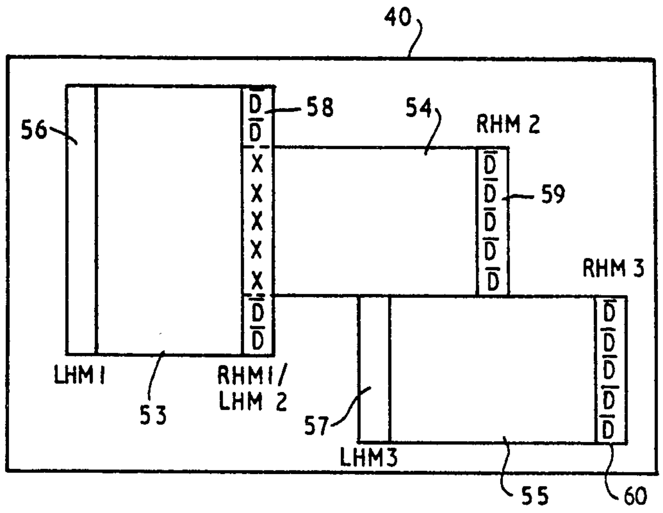
FIG. 8 illustrates a display screen having three independent partitions formed thereon, each having left and right hand margin attribute bytes associated therewith.

By providing a right hand margin attribute byte (RHM) at the right hand end of each row of a partition, improvements similar to the above can be obtained when processing forward through the partition. FIG. 8 shows a screen with three partitions 53, 54, and 55 having left hand margins 56 and 57 and right hand margins 58, 59 and 60. Note that the RHM attributes of one partition may merge with the LHM attributes of another partition. To maintain data integrity of the partitions, they can not, however, be positioned any closer horizontally. This restriction does not apply to vertical positions so the bottom row of one partition may abut the top row of the partition below. Setting the RHM attribute bytes to "non-display" results in blanking out areas of the screen that fall outside the partitions.

Where the LHM and RHM attributes are applied to the optional feature described above where each character byte has an extended attribute byte associated with it, the LHM and RHM attributes also have two bytes per margin. The generation, maintenance and the use of the LHM and RHM attribute pairs remain unchanged in principle to the single LHM and RHM attributes described above.

The LHM and RHM attributes exist outside the area defined as the partition size and therefore can not be altered directly by the data streams. Nor can they be altered directly by keyboard action. Provision of the LHM and RHM attributes requires slightly more character buffer size than would be the case if they were not provided. Thus, for a display of 43 rows of 80 characters per row, some 86 (or 172 bytes) of extra buffer storage would be required (depending on whether or not the terminal incorporates the extended attribute feature). These extra buffer areas are represented by 18L and 18R in FIG. 2.

Forward or reverse scrolling of data within partitions, or of the whole screen (which can be regarded as a single partition) is performed by writing new data from section 16 of read/write memory 14 into the appropriate partition within character buffer section 18 of memory 14. The setting up of partitions, margins and scrolling are performed by microprocessor 7 under control of microcode read from section 15 of the read/write memory 14.

While the present invention has been particularly described with reference to the preferred embodiment thereof, it will be understood by those skilled in the art that various changes in form and detail may be made therein without departing from the spirit and scope of the invention.

What is claimed is:

1. A video display terminal comprising:

a video display device for displaying characters;

a character buffer for storing therein character code bytes representing characters to be displayed;

display control logic means for causing characters corresponding to character code bytes stored in said character buffer to be displayed on said video display device; and processing means for loading character code bytes representing characters to be displayed on said video display device into said character buffer in positions corresponding to the desired positions of the characters on the display device; and for defining two or more partitions on said video display device and for assigning margin attribute bytes to one margin of each partition.

2. A video display terminal as claimed in claim 1 further comprising keyboard data entry means for entering characters to be displayed on said video display device into said character buffer.

3. A video display terminal as claimed in claim 1 wherein said processing means is a microprocessor having a data bus and an address bus connected thereto, said character buffer being connected to said data bus and said address bus so that data can be written into and read from said character buffer.

4. A video display terminal as claimed in claim 1, wherein said video display device is a raster scan cathode ray tube requiring refresh, further comprising a line buffer for receiving character bytes representing a line of characters to be displayed on the cathode ray tube from the character buffer and a character generator addressable by said line buffer for generating bit patterns associated with that line of characters; and wherein said display control logic loads the line buffer by line from said character buffer to refresh said cathode ray tube.

5. A video display terminal as claimed in claim 4, wherein said character generator includes a read/write memory and wherein said processing means further includes means for loading a character set into said read/write memory.

6. A video display terminal as claimed in claim 4 or claim 5, wherein said line buffer has sufficient capacity to store bytes representing two lines of characters, and wherein said display control logic loads said line buffer with bytes associated with one line of characters while bytes representing the immediately preceding line are accessing said character generator to refresh the cathode ray tube.

7. A video display terminal comprising:

a video display device for displaying characters;

a character buffer for storing therein character code bytes representing characters to be displayed;

display control logic means for causing characters corresponding to character code bytes stored in said character buffer to be displayed on said video display device; and processing means for loading character code bytes representing characters to be displayed on said video display device into said character buffer, in positions corresponding to the desired positions of the characters on the display device; and for defining one or more partitions on said video display device, each of said partitions including a left hand margin and a right hand margin; and for assigning margin attribute bytes to the left hand margin and the right hand margin of each defined partition.

8. A video display terminal comprising:

a video display device including a cathode ray tube, raster scanned from left to right, for displaying characters;

a character buffer for storing therein character code bytes representing characters to be displayed;

display control logic means for causing characters corresponding to character code bytes stored in said character buffer to be displayed on said video display device; and processing means for loading character code bytes representing characters to be displayed into said character buffer, in positions corresponding to the desired positions of the characters on the display device; and for defining one or more partitions on said video display device, each of said partitions including a left hand margin and a right hand margin; and for assigning margin attribute bytes to the left hand margin and the right hand margin of each defined partition; a non-display field margin attribute byte being assigned to the right hand margin of each defined partition which does not correspond to the left hand margin of an adjacent partition.

9. A video display terminal comprising:

a video display device including a cathode ray tube, raster scanned from left to right, for displaying characters;

a character buffer for storing therein character code bytes representing characters to be displayed;

display control logic means for causing characters corresponding to character code bytes stored in said character buffer to be displayed on said video display device; and processing means for loading character code bytes representing characters to be displayed into said character buffer, in positions corresponding to the desired positions of the characters on the display device; and for defining one or more partitions on said video display device, each of said partitions including a left hand margin and a right hand margin; and for assigning margin attribute bytes to the left hand margin and the right hand margin of each defined partition; and for assigning to the left hand margin of each display line of each defined partition a margin attribute byte identical to the field attribute byte within the defined partition which controls the character immediately adjacent the left hand margin.

10. A video display terminal comprising:

a video display device for displaying characters;

a character buffer for storing therein representations of characters to be displayed, each character to be displayed being represented by a pair of character code bytes, one byte designating the character to be displayed and the other byte being an attribute byte for defining how the character is to be displayed;

display control logic means for causing characters corresponding to character code bytes stored in said character buffer to be displayed on said video display device; and processing means for loading the representations of characters to be displayed into said character buffer, in positions corresponding to the desired positions of the characters on the display device; and for defining one or more partitions on said video display device and for assigning margin attribute bytes to one margin of each defined partition.

11. The video display terminal of claim 10 wherein margin attribute bytes are assigned to each margin of each defined partition.

12. A video display terminal comprising:

a video display device for displaying characters;

a read/write memory including a character buffer for storing therein character code bytes representing characters to be displayed, and including a section for storing therein character data including said character code bytes;

display control logic means for causing characters corresponding to character code bytes stored in said character buffer to be displayed on said video display device; and processing means for reading or writing character data into or from said section of said read/write memory; for loading said character code bytes from said section of said section to said character buffer in positions corresponding to the desired positions of the characters on the display device; for defining one or more partitions on said video display device; and for assigning margin attribute bytes to one margin of each defined partition.

* * * * *